United States Patent
Teh et al.

(10) Patent No.: US 9,516,023 B2
(45) Date of Patent: Dec. 6, 2016

(54) SYSTEM AND METHOD FOR TRANSFERRING ELECTRONIC INFORMATION

(71) Applicants: Hon Seng Teh, Puchong (MY); Kah Heng Chong, Puchong (MY); Yuan Yew Choo, Puchong (MY)

(72) Inventors: Hon Seng Teh, Puchong (MY); Kah Heng Chong, Puchong (MY); Yuan Yew Choo, Puchong (MY)

(73) Assignee: INFOSTANDARD SDN. BHD., Kuala Lumpur (MY)

( * ) Notice: Subject to any disclaimer, the term of this patent is extended or adjusted under 35 U.S.C. 154(b) by 48 days.

(21) Appl. No.: 14/560,582

(22) Filed: Dec. 4, 2014

(65) Prior Publication Data

US 2015/0156197 A1 Jun. 4, 2015

(30) Foreign Application Priority Data

Dec. 4, 2013 (MY) ................................ 2013702360

(51) Int. Cl.
*H04L 29/06* (2006.01)
*H04L 29/08* (2006.01)

(52) U.S. Cl.
CPC ........... *H04L 63/0861* (2013.01); *H04L 67/02* (2013.01); *H04L 67/22* (2013.01); *H04L 67/1097* (2013.01); *H04L 67/26* (2013.01)

(58) Field of Classification Search
USPC ........................................................ 713/186
See application file for complete search history.

(56) References Cited

U.S. PATENT DOCUMENTS

| 7,114,648 | B2 | 10/2006 | Ginskey et al. |
| 2004/0148526 | A1* | 7/2004 | Sands ...................... G06F 21/32 726/5 |
| 2013/0167196 | A1* | 6/2013 | Spencer .................. H04W 8/22 726/3 |
| 2014/0125502 | A1* | 5/2014 | Wittkop ................. G08G 1/127 340/989 |
| 2015/0156197 | A1* | 6/2015 | Teh ...................... H04L 63/0861 713/186 |

FOREIGN PATENT DOCUMENTS

JP 2002163693 6/2002

OTHER PUBLICATIONS

English Abstract of JP 2002163693.

* cited by examiner

*Primary Examiner* — Harris C Wang
(74) *Attorney, Agent, or Firm* — Preston Smirman; Smirman IP Law, PLLC

(57) ABSTRACT

A system for collecting and transferring electronic information includes one or more servers, having one or more centralized databases for storing or retrieving the data, connected to a network, one or more computing devices connected to the servers via the network for retrieving the data from the centralized databases, and a plurality of biometric devices connected to the servers via the network, located at different locations. Each biometric device comprises a system for identifying users based on biometric data of the users, a system for storing the biometric data and activity information of the users, and a system for sending the biometric data and activity information to the servers, in communication with the servers in real time via the network.

16 Claims, 1 Drawing Sheet

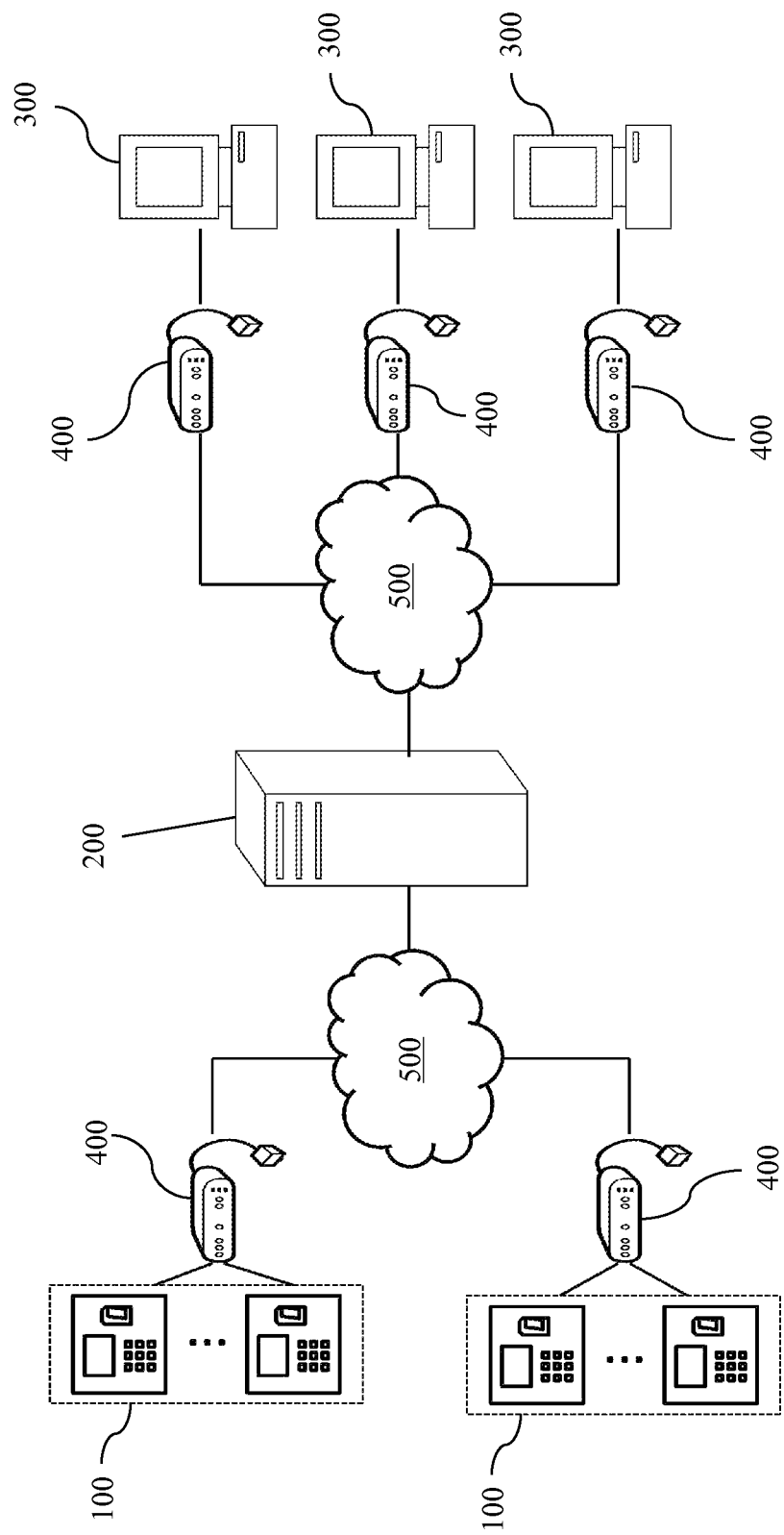

SYSTEM AND METHOD FOR TRANSFERRING ELECTRONIC INFORMATION

CROSS-REFERENCE TO RELATED APPLICATION

The instant application claims priority to Malaysian Patent Application Ser. No. PI 2013702360, filed Dec. 4, 2013, the entire specification of which is expressly incorporated herein by reference.

FIELD OF INVENTION

The present invention relates to a system and method for collecting and transferring electronic information. More particularly, the present invention relates to a system and method for collecting activity information and biometric data from multiple biometric devices at different locations to a centralized database.

BACKGROUND OF THE INVENTION

The use of biometric devices for identifying an individual based on their physical characteristic has markedly increased in recent year. While these devices verifying a person's identification, the devices also kept the transaction information such as the entrance time, location, exit time and etc within its integrated memory unit. A third party can only retrieve the information from a computing device which has a direct connectivity with the biometric device. The drawbacks of such arrangement are the information is needed to be manually retrieved by the user themselves. Consequently, it is extremely inconvenient for companies having multiple branches to collect the information. Therefore, an automation system for transferring the information to centralized database and the third party then retrieves the information from centralized database is preferred.

There are a few patented technologies relating to the abovementioned system. Of interest in respect to a system and method for time keeping management is U.S. Pat. No. 7,114,648. This patent discloses a system includes one or more time-keeping network appliances. Each of these appliances includes a small web server. The system also includes at least one of a card reader, or some other kind of identification interface. These devices are used to clock employees in and out. The system also optionally includes an audio-output device to give the employee audio feedback.

Another invention relates to a time recorder network system is disclosed in Japanese Patent No. JP2002163693. This patent reveals a time recorder network system capable of performing centralized processing of the information of the time recorder. The system comprises time recorder installed including attendance time information recording function, a communication function to communicate with the client, and a function for linking personal information. The described systems are designed to aggregate information from a single branch and stored it in a database, it may lack of consistency in collecting data from different branches which located in rural areas and leads to the occurrences of receiving corrupted data or missing data.

Therefore, there is a need to provide a flexible network that able to facilitate different biometric devices which are located at different rural areas such that biometric data and activities of the biometric devices are automatically transferred and stored in a centralized data, where the information is able to be retrieve and monitored.

SUMMARY OF INVENTION

One object of the invention is to provide a system and method for collecting data from biometric devices and stored the collected data to a centralized database.

Another object of the invention is to provide a system and method for users to retrieve the collected data from the centralized database.

Still another object of the invention is to develop a system and method for transferring biometric data and activity information from various sites and overcomes connectivity factors such as geographically remote location.

At least one of the preceding objects is met, in whole or in part, by the invention, in which the embodiment of the invention discloses a system for collecting and transferring electronic information comprising: one or more servers, having one or more centralized databases for storing or retrieving data, connected to a network; one or more computing devices connected to the servers via the network for retrieving the data from the centralized databases; a plurality of biometric devices connected to the servers via the network, located at different locations, and each biometric device comprises: a system for identifying users based on biometric data of the users; a system for storing the biometric data and activity information of the users; and a system for sending the biometric data and activity information to the servers, in communication with the servers in real time via the network; characterized in that the biometric devices are configured to identify a user based on the biometric data, and collect activity information of the user, following which real time activity information together with the corresponding biometric data of the user is sent to the servers based on HTTP PUSH protocol; wherein the activity information and the biometric data of the users are stored in the centralized databases of the servers and are enabled to be retrieved by the computing devices.

In one preferred embodiment of the invention, the biometric devices receive one or more instructions from the computing devices through the servers. Furthermore, the biometric devices communicate with the server via a wireless connection, a router, a modem, Ethernet connection, and an Internet connection or a combination thereof. Moreover, the biometric devices communicate with the servers every predetermined period. Also, each biometric device is assigned with an Internet protocol address. Preferably, the activity information includes a user name, time, activity, location, and logs.

In another preferred embodiment of the invention, the servers are integrated with a web based application to facilitate communication between the biometric devices and the servers.

The centralized databases are structured query language (SQL) database. A web based application displays the status of each biometric device and the web based application facilitates communication between the computing devices and the servers.

A further embodiment of the present invention is a method for transmitting electronic transactions comprising the steps of: establishing communication between one or more servers and one or more biometric devices via a network; identifying users based on biometric data of the users; collecting activity information of the users during the identifying the users; sending real time activity information together with corresponding biometric data of the user to the servers upon the collection; storing the activity information of user in centralized databases of the servers; establishing communication between one or more servers and one or more computing devices via the network; retrieving the activity information of user via the computing devices.

Additionally, the biometric data or activity information of user is sent to the servers based on HTTP PUSH protocol. Preferably, the HTTP PUSH protocol comprises the steps of: retrieving configuration information or commands from the servers by the biometric device; executing the configuration or commands; transferring the activity information or the biometric data of the user to the servers. Further, the biometric devices resend the activity information or biometric data of the user to the servers when the servers return a negative response. Besides that, the biometric devices retrieve the configuration information and/or the commands every predetermined period.

One skilled in the art will readily appreciate that the invention is well adapted to carry out the objects and obtain the ends and advantages mentioned, as well as those inherent therein. The embodiments described herein are not intended as limitations on the scope of the invention.

BRIEF DESCRIPTION OF THE DRAWINGS

For the purpose of facilitating an understanding of the invention, there is illustrated in the accompanying drawing the preferred embodiments from an inspection of which when considered in connection with the following description, the invention, its construction and operation and many of its advantages would be readily understood and appreciated.

FIG. 1 illustrates a schematic view of an illustrative embodiment of the biometric data or the activity information transferring system and method of the present invention.

DETAILED DESCRIPTION OF THE INVENTION

The present invention relates to a system and method for collecting and transferring electronic information. More particularly, the present invention relates to a system and method for collecting activity information and biometric data from multiple biometric devices at different locations to a centralized database.

Hereinafter, the invention shall be described according to the preferred embodiments of the present invention and by referring to the accompanying description and drawings. However, it is to be understood that limiting the description to the preferred embodiments of the invention and to the drawings is merely to facilitate discussion of the present invention and it is envisioned that those skilled in the art may devise various modifications without departing from the scope of the appended claim.

FIG. 1 illustrates a schematic diagram depicting a system for transferring biometric data and activity information. The system includes one or more servers (200) connected to communicate with each biometric device (100), and with one or more computing devices (300). The biometric devices (100) may be any biometric devices (100) that able to compare and store live biometric data. Specifically, the biometric devices (100) may include fingerprint devices, voice recognition devices, face recognition devices, hand geometric reader, and iris recognition device. Preferably, the biometric devices (100) are fingerprint biometric devices.

The biometric devices (100) may be incorporated into digital readers, laptop, mobile phone, or any electrical devices functioned together with microcontroller in a way such that the devices (100) have authentication function and being useful in attendance application. Moreover, the acquired data can be temporarily stored on each biometric device (100) in its integrated memory card or any system for storing data that which are insertable. Besides that, the biometric data may be connected together to form a network such that the acquired data can be shared and stored among each other to prevent data lost. However, it is understood that the biometric devices (100) may be connected to as many other devices as necessary for a particular application, and may include combinations of different types of biometric devices, and in various network configurations. The biometric devices (100) may be all in a same building or in entirely different location. The connection (400) between the biometric devices (100) and server can be wired, wireless modern, Internet, or Ethernet connection through any suitable networking devices. Preferably, the elements of the system are connected through an Internet connection via World Wide Web (WWW). In the event of a connection failure, the biometric devices (100) may store the data into the integrated memory card and resume sending the data once the connection is established again for avoiding any loss of data and records.

It should be noted that the biometric devices (100) may be use by either users which the system is able to recognize through the pre-stored biometric information within the system or non-recognizable users. Therefore, for the convenience of description, any person (known or unknown users to the system) who uses the biometric device (100) shall be referred to as a user of the system. The user is required to verify themselves through the corresponding biometric devices (100) before any application is being activated. During the verification, biometric data of the user or activity information of the corresponding biometric devices (100) or the cooperated electrical devices are collected and stored within the biometric device (100). The activity information may include user name, time, location, logs, and enrolment, transaction records and etc. Then, the biometric devices (100) establish communication with the servers (200) and send the stored information to the servers (200). When a user is not recognizable by the system, the biometric data of the corresponding user will be recorded and further sent to the servers (200) for security purposes. These processes should be carried out using sufficiently rapid communications technologies so that the data processing needed to complete the purchase is accomplished in "real time" from the standpoint of a user.

In one preferred embodiment of the invention, the servers (200) comprise one or more heavy duty computers for processing and transferring the received data from the biometric devices (100), and any known devices or group of devices to provide sufficient capacity for storing data. When the servers (200) receive the data from the biometric devices (100), the computers process the data and transfer the data to a database for storing. Preferably, the communication is communicated by the way of the World Wide Web. Then, the proprietor or operator of the servers (200) can establish a website which is accessible from any suitably-programmed computer (300), as well as from other terminals (100) as described above. Specifically, the website is a web platform which is integrated with web application or modules to facilitate every single biometric device (100) in the system. The web platform is preferably built on the latest Microsoft Technology, Visual Studio with the latest .NET Framework as the architecture of the system. Further the servers (200) may run on Microsoft Internet Information Services (IIS) in which supports My Structured Query Language (MYSQL) database, allowing the servers (200) to consolidate data from the biometric data into the MYSQL database and centralize data from all the biometric devices (100) through the web to the servers (200).

The MYSQL is one of the reliable and convenient open source code databases that include software integration and data extraction. The advantage is raw data of the database is integratable to existing software or system. And hence, any third party modules can be implemented into the servers (200) for various applications depending on the users' requests. In accordance with this embodiment of the invention, the users are able to log into the web platform and retrieve the data from the database via any types of third party computing device (300) which has an Internet browser or any other systems to access the Internet and connect. In addition, the computing devices (300) may also integrate with any suitable modules for different applications such as payroll application, attendance application, action management application, and etc. The user may also able to remotely control one or more biometric devices (100) via the web platform's interface.

In another preferred embodiment of the invention, the biometric data and activity information is sent from the biometric devices (100) to the servers (200) based on HTTP PUSH protocol. The general architecture of HTTP PUSH protocol is the biometric devices (100) actively communicates with the servers (200), and the data in each devices (100) is uploaded to the servers (200) actively. Besides that, the biometrics devices (100) also actively consult the servers for command if a change of configuration is need. In this example, each biometric device (100) is assigned with an IP address so that the servers (200) are able to identify and remotely control the designated biometric device (100). In addition, since the biometric device (100) is assigned with an IP address, the status of each terminal (100) is viewable on the web platform's interface.

The HTTP PUSH protocol can be implemented in a number of different ways, and incorporating a variety of different components and technologies. Among the various embodiments of the protocol, the preferred steps are the following: firstly, the biometric device (100) acquires configuration information from servers (200) by sending a request to get configuration information from the servers (200), and then the servers (200) return configuration information to the corresponding device. This step occurs when ever the biometric device (100) is firstly connected to the servers (200) or the device (100) itself being restarted. The configuration information may include time interval settings under various conditions, real-time settings, authentication settings, activity record settings, operation settings, and biometric data record settings.

Secondly, after the biometric device (100) is configured, the device (100) sends updated receipt or stamp to the servers (200) for a request to upload new input data on a real-time basis or per fixed time. Further, the basis is determined by the real-time settings. If there is new input data recorded, the servers (200) will return command for accepting the new input data and the biometric data will send the new input data to the servers (200).

Thirdly, if a command for instructing one or more biometric devices (100) to perform one or more functions, the command is firstly stored in the servers' (200) database. Once the biometric devices (100) communicate with the servers (200), the servers (200) will then send the command to the devices (100). The servers (200) may return multiple commands to the corresponding devices at the same time. Furthermore, each command is assigned with a signature indicating the designated devices (100) have not executed yet. Next, the devices (100) will execute the command and return the execution result. And then the servers (200) receive the execution result and update the signature. Preferably, the biometric devices (100) communicate with the servers (200) per a predetermined period of time, according to the configuration. In the cases that when the servers (200) is connected to the devices (100) directly via LAN or WAN, the servers (200) may send a notification to the devices (100) for an immediate communication. Upon the devices (100) receiving such notification, the devices (100) will immediately consult the servers (200) for updates. In this example of the invention, remotely control the biometric devices (100) via the servers (200) is achieved.

In some applications, the present invention described above may be provided as elements of an integrated software system, in which the features may be provided as separate elements of a computer program. Some embodiments may be implemented, for example, using a computer-readable storage medium (e.g., non-transitory) or article which may store an instruction or a set of instructions that, if executed by a processor, may cause the processor to perform a method in accordance with the embodiments. Other applications of the present invention may be embodied as a hybrid system of dedicated hardware and software components. Moreover, not all of the features described above need be provided or need be provided as separate units. Additionally, it is noted that the arrangement of the features do not necessarily imply a particular order or sequence of events, nor are they intended to exclude other possibilities. For example, the features may occur in any order or substantially simultaneously with each other. Such implementation details are immaterial to the operation of the present invention unless otherwise noted above.

The exemplary methods and computer program instructions may be embodied on a computer readable storage medium (e.g., non-transitory) that may include any medium that can store information. Examples of a computer readable storage medium (e.g., non-transitory) include electronic circuits, semiconductor memory devices, ROM, flash memory, erasable ROM (EROM), floppy diskette, CD-ROM, optical disk, hard disk, fiber optic medium, or any electromagnetic or optical storage device. In addition, a server or database server may include computer readable media configured to store executable program instructions. The features of the embodiments of the present invention may be implemented in hardware, software, firmware, or a combination thereof and utilized in systems, subsystems, components or subcomponents thereof.

Furthermore, a software program embodying the features of the present invention may be used in conjunction with a computer device. Examples of a computing device may include, but are not limited to, an electronic book reading device, a computer workstation, a terminal computer, a server computer, a handheld device (e.g., a tablet computer, a personal digital assistant "PDA", a mobile telephone, a Smartphone, etc.), a web appliance, a network router, a network switch, a network bridge, any machine capable of executing a sequence of instructions that specify an action to be taken by that machine, and any combinations thereof. In one example, a computing device may include and/or be included in, a kiosk.

The computer device may also include an input device. In one example, a user of the computer device may enter commands and/or other information into computer device via an input device. Examples of an input device may include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), touchscreen, and any combinations thereof. The input device may be interfaced to bus via any of a variety of interfaces including, but not limited to, a serial interface, a parallel interface, a game port, a USB interface, a FIREWIRE interface, a direct interface to bus, and any combinations thereof. The input device may include a touch screen interface that may be a part of or separate from the display.

A user may also input commands and/or other information to the computer device via a storage device (e.g., a removable disk drive, a flash drive, etc.) and/or a network interface device. A network interface device, such as network interface device may be utilized for connecting the computer device to one or more of a variety of networks, such as a network, and one or more remote devices connected thereto. Examples of a network interface device may include, but are not limited to, a network interface card (e.g., a mobile network interface card, a LAN card), a modem, and any combination thereof. Examples of a network may include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software, etc.) may be communicated to and/or from the computer device via a network interface device.

The computer device may further include a video display adapter for communicating a displayable image to a display device, such as a display device. Examples of a display device may include, but are not limited to, a liquid crystal display (LCD), a cathode ray tube (CRT), a plasma display, a light emitting diode (LED) display, and any combinations thereof. In addition to a display device, the computer device may include one or more other peripheral output devices including, but not limited to, an audio speaker, a printer, and any combinations thereof. Such peripheral output devices may be connected to a bus via a peripheral interface. Examples of a peripheral interface may include, but are not limited to, a serial port, a USB connection, a FIREWIRE connection, a parallel connection, and any combinations thereof.

The present disclosure includes as contained in the appended claims, as well as that of the foregoing description. Although this invention has been described in its preferred form with a degree of particularity, it is understood that the present disclosure of the preferred form has been made only by way of example and that numerous changes in the details of construction and the combination and arrangements of parts may be resorted to without departing from the scope of the invention.

What is claimed is:

1. A system for collecting and transferring electronic information, comprising:
   one or more servers, having one or more centralized databases for storing or retrieving data, connected to a network;
   one or more computing devices connected to the servers via the network for retrieving the data from the centralized databases;
   a plurality of biometric devices connected to the servers via the network, are located at different locations, and each biometric device comprises:
   a system for identifying users based on biometric data of the users;
   a system for storing the biometric data and activity information of the users; and
   a system for sending the biometric data and activity information to the servers, in communication with the servers in real time via the network;
   wherein the biometric devices are configured to identify at least one of the users based on the biometric data, and collect activity information of the identified user, following which real time activity information together with the corresponding biometric data of the identified user is sent to the servers based on a HTTP PUSH protocol;
   wherein, during the data transmission using the HTTP Push protocol, the biometric devices firstly retrieve configuration information including time interval settings under various conditions, real-time settings, authentication settings, activity record settings, operation settings, and biometric data record settings from the servers by sending a request and the servers will return the configuration information to the device, then the biometric devices send an updating receipt to the servers for requesting to upload new data and the servers will return a command for updating if new data is available, and followed by the biometric devices executing the command to push the activity information and the biometric data to the servers;
   wherein the activity information and the biometric data of the users are stored in the centralized databases of the servers and are enabled to be retrieved by the computing devices.

2. The system according to claim 1, wherein the biometric devices receive one or more instructions from the computing devices through the servers.

3. The system according to claim 1, wherein the activity information includes a user name, time, activity, location, and logs.

4. The system according to claim 1, wherein the biometric devices communicate with the servers via a wireless connection, a router, a modem, Ethernet connection, and an Internet connection or a combination thereof.

5. The system according to claim 1, wherein the biometric devices communicate with the servers every predetermined period.

6. The system according to claim 1, wherein the servers are integrated with a web based application to facilitate communication between the biometric devices and the servers.

7. The system according to claim 1, wherein each biometric device is assigned with an Internet protocol (IP) address.

8. The system according to claim 1, wherein the centralized databases are structured query language (SQL) database.

9. The system according to claim 1, wherein the biometric devices are connected to the servers through the Internet via World Wide Web (WWW).

10. The system according to claim 1, wherein the computing devices are connected to the servers through the Internet via World Wide Web (WWW).

11. The system according to claim 1, wherein the servers are integrated with a web based application to facilitate communication between the biometric devices and the servers.

12. The system according to claim 11, wherein the web based application displays a status of each biometric device.

13. A method for transmitting electronic transactions, comprising the steps of:
   establishing communication between one or more servers and one or more biometric devices via a network;
   identifying users based on biometric data of the users;
   collecting activity information of the users during the identifying the users;
   sending real time activity information together with corresponding biometric data of the users to the servers upon the collection based on a HTTP PUSH protocol;
   storing the activity information of the users in centralized databases of the servers;
   establishing communication between one or more servers and one or more computing devices via the network; and
   retrieving the activity information of the users via the computing devices;
   wherein the HTTP PUSH protocol comprises the steps of:
      retrieving, by the biometric devices, configuration information including time interval settings under various conditions, real-time settings, authentication settings, activity record settings, operation settings, and biometric data record settings from the servers by sending a request;
      sending, by the biometric devices, an updating receipt to the servers for requesting to upload new data and
      executing, by the biometric devices, the command to push the activity information and the biometric data to the servers.

14. The method according to claim 13, wherein the servers are integrated with a web based application to facilitate communication between the biometric devices and the servers.

15. The method according to claim 13, wherein the biometric devices resend the activity information or biometric data of the users to the servers when the servers return a negative response.

16. The method according to claim 1, wherein the biometric devices retrieve the configuration information or the commands every predetermined period.

* * * * *